(12) United States Patent
Lee et al.

(10) Patent No.: US 8,796,975 B2
(45) Date of Patent: Aug. 5, 2014

(54) SOFT-START AND SOFT-LOCK START ON MOTOR DRIVING APPARATUS

(75) Inventors: Teng-Hui Lee, New Taipei (TW); Kuo-Yung Yu, New Taipei (TW); Chen-Pin Lo, New Taipei (TW)

(73) Assignee: Amtek Semiconductor Co., Ltd., New Taipei (TW)

( * ) Notice: Subject to any disclaimer, the term of this patent is extended or adjusted under 35 U.S.C. 154(b) by 322 days.

(21) Appl. No.: 13/338,698

(22) Filed: Dec. 28, 2011

(65) Prior Publication Data

US 2013/0069576 A1    Mar. 21, 2013

(30) Foreign Application Priority Data

Sep. 21, 2011   (TW) .............................. 100133896 A (51) Int. Cl.
*H02P 1/16*    (2006.01)
(52) U.S. Cl.
CPC ........................................ *H02P 1/16* (2013.01)
USPC ........... 318/431; 318/811; 318/810; 318/807; 318/767; 318/727
(58) Field of Classification Search
CPC ....................................................... H02P 1/16

USPC .......... 318/431, 430, 811, 810, 807, 767, 727
See application file for complete search history.

(56) References Cited

U.S. PATENT DOCUMENTS

| 5,099,181 | A | * | 3/1992 | Canon ....................... 318/400.08 |
| 6,545,442 | B2 | * | 4/2003 | Sunaga et al. ................. 318/727 |
| 6,657,406 | B2 | * | 12/2003 | Enzinna et al. ............... 318/280 |
| 6,779,981 | B2 | * | 8/2004 | Huang et al. .................... 417/42 |
| 8,618,763 | B2 |   | 12/2013 | Noie et al. |

FOREIGN PATENT DOCUMENTS

TW        201029314 A1    8/2010

* cited by examiner

*Primary Examiner* — David Luo
(74) *Attorney, Agent, or Firm* — Ming Chow; Sinorica, LLC (57) ABSTRACT

A motor driving apparatus is disclosed herein and includes a control unit, a soft-start unit and an output unit. When power-up or lock release situation, an external PWM driving signal is inputted to the soft-start unit, the soft-start unit generates an internal PWM driving signal and a power-up initial signal; after the power-up initial signal is generated, the control unit transmitting a motor rotation signal to the soft-start unit; when the soft-start unit counts a plurality of the motor rotation signal, the soft-start unit selects the external PWM driving signal or the internal PWM driving signal to output to the output unit.

11 Claims, 5 Drawing Sheets

SOFT-START AND SOFT-LOCK START ON MOTOR DRIVING APPARATUS

BACKGROUND OF THE INVENTION

1. Field of the Invention

The present invention is related to a motor driving apparatus, and more particularly related to a motor driving apparatus with soft-start and soft-lock start function, and an external Pulse Width Modulation (PWM) driving signal is transmitted through a soft-start unit to count the motor rotation signals so as to determine the output of the motor driving apparatus and achieve power-up soft-start function and soft-lock start function.

2. Description of the Prior Art

In recent years, personal computer (PC), portable computer/notebook (NB) or workstation are well development and the calculation speed of the micro chips (such as central unit processor (CPU) or digital signal processor (DSP)) are increased so fast. However, when the calculation speed of the micro chips is increased and the clock frequency is increased, there is lots of heat generated in the micro chips. The high temperature will result the following issues: the calculation malfunction of the microchip, and the influence of the circuits around the micro chips. Therefore, the thermal function of the micro chips is extremely significant technique.

Figure 1A:
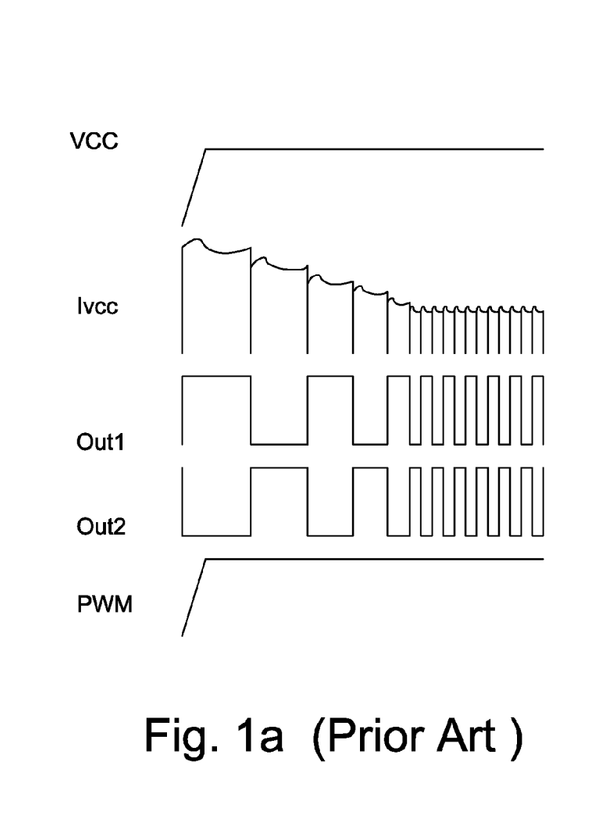
FIG. 1a is a voltage and current view illustrating the moment of the power-up in prior art.

Generally, the thermal method of the processing micro chips implements the conventional fans to solve the heat radiation. For example, the motor control driving device is used to turn on the fans to bring cooler air to the surface of the micro chips for heat radiation. However, the conventional method to drive the motor by the motor driving apparatus is required to generate the maximum torque to drive the motor so as to overcome the maximum torque limit. This kind of driving method won't cause any problems when the motor with low power. However, if the motor with high power or small internal resistances is used and the motor power is turned on by the maximum torque, a very large current is generated at the turn-on moment, as shown in FIG. 1a. After the power is turned on, the turn on voltage and the pulse width modulation signal are 100%, obviously, at this moment, the turn-on current is the largest and the noise is the largest. If the motor driving apparatus includes a current protect device, the motor driving apparatus won't be impacted by large current. If the motor driving apparatus doesn't include the current protect device, the motor driving apparatus will be destroyed at the moment when the power is turned on.

Figure 1B:
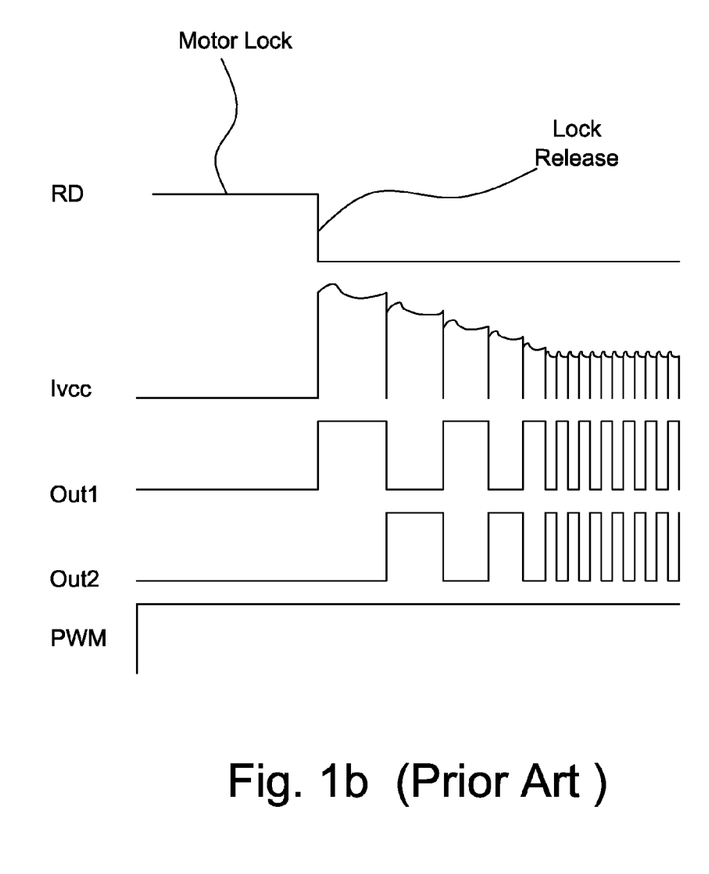
FIG. 1b is a voltage and current view illustrating the moment of motor lock-soft start in prior art.

In addition, when the motor is in a lock condition because the irresistible external force of the motor or the inaccuracy of the motor, the motor driving apparatus will restart to drive the motor and confirm the irresistible external force is disappeared after a period of time. When the irresistible external force is disappeared, the motor will restart. At the same situation, in order to make sure the motor to restart, the maximum torque is used to drive the motor as the circumstance when the power is turned on. If the motor with high power or small internal resistances is used and the motor power is turned on by the maximum torque, a very large current is generated at the turn-on moment, as shown in FIG. 1b, and the motor driving apparatus would be destroyed when the motor is restarted.

In order to overcome the problem of the motor driving apparatus described above, there is a motor driving apparatus with a soft-start and soft lock-start function included in the present invention. An internal PWM control signal is used to count the motor rotation signal in the soft-start unit to determine the output of the motor driving apparatus so as to achieve soft-start and soft lock-start purposes.

SUMMARY OF THE INVENTION

The main object of the present invention is to provide a motor driving apparatus with soft-start function according to prior art. The output control signal of the motor driving apparatus is determined in accordance with the counting number of the motor rotation signal.

Another object of the present invention is to provide a motor driving apparatus with a soft-lock start function. The output control signal of the motor driving apparatus is determined in accordance with the counting number of the motor rotation signal.

Another object of the present invention is to provide a motor driving apparatus with a soft-start and soft-lock start function. The output control signal of the motor driving apparatus is determined in accordance with the counting number of the motor rotation signal. As the peak value of the current of the soft-start or soft-lock start is decreased, the life cycle and reliability of the motor driving apparatus is increased.

Another object of the present invention is to provide a motor driving apparatus with a soft-start and soft-lock start function. The output control signal of the motor driving apparatus is determined in accordance with the counting number of the motor rotation signal. As the peak value of the current of the soft-start or soft-lock start is decreased, the noise is decreased when the motor driving apparatus is turned on.

Therefore, according to the objects described above, a motor driving apparatus including a control unit, a soft-start unit and an output unit, and is characteristic by: when an external control signal inputs to the soft-start unit, the soft-start unit generates an internal control signal and when Vcc turns on, a power-up initial signal will be generate; after the power-up initial signal is generated, the control unit transmitting a motor rotation signal to the soft-start unit and selects the internal PWM driving signal to the output unit; when the soft-start unit counts a plurality of the motor rotation signal, the soft-start unit selects the external PWM driving signal to output to the output unit.

A motor driving apparatus including a control unit, a soft-start unit and an output unit, wherein the control unit includes a motor rotation signal (FG) and a rotation detecting signal (RD) and is characteristic by: when an external control signal inputs to the soft-start unit, the soft-start unit generates an internal PWM driving signal and when Vcc turns on, a power-up initial signal will be generate; after the power-up initial signal is generated, the control unit transmitting a motor rotation signal to the soft-start unit and selects the internal PWM driving signal to the output unit; when the soft-start unit counts a plurality of the motor rotation signal, the soft-start unit selects the external PWM driving signal to the output unit.

A motor driving apparatus including a control unit, a soft-start unit and a output unit, and is characteristic by: wherein the soft-start unit includes an internal PWM pulse signal generator, a power-up initial generator, a FG counter, a RS latch circuit and a select circuit. The internal PWM pulse signal generator is configured to provide an internal PWM driving signal. The power-up initial generator is configured to provide a power-up initial signal. An input end of the FG counter is connected to the motor rotation signal and the power-up initial signal, and configured to count a plurality of the motor rotation signals (FG) so as to output a control signal. The input end of the RS latch circuit is connected to the power-up initial signal and the control signal outputted by the FG counter so as to output a select signal. A first input end of the select circuit is connected to the external PWM driving signal, a second input end is connected to the internal PWM driving signal, a third input end is connected to the select signal and a output end transmits a soft-start control signal to the control unit and the control unit outputs a PWM driving signal to the output unit.

A motor driving apparatus including a control unit, a soft-start unit and an output unit, and the control includes provides a rotation detecting signal and is characteristic by: wherein the soft-start unit includes an internal PWM pulse signal generator, a power-up initial generator, a FG counter, a RS latch circuit, and a select circuit. The internal PWM pulse signal generator is configured to provide an internal PWM driving signal. The power-up initial generator is configured to provide a power-up initial signal. An input end of the FG counter is connected to the motor rotation signal and the power-up initial signal, and configured to count a plurality of the motor rotation signal (FG) so as to output a control signal. An input end of the RS latch circuit is connected to the power-up initial signal and the control signal outputted by the FG counter so as to output a select signal. A first input end of the select circuit is connected to the external PWM driving signal, a second input end is connected to the internal PWM driving signal, a third input end is connected to the select signal and a output end transmits a soft-start control signal to the control unit and the control unit outputs a PWM control signal to the output unit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The foregoing aspects and many of the attendant advantages of this invention will become more readily appreciated as the same becomes better understood by reference to the following detailed description, when taken in conjunction with the accompanying drawings, wherein:

The present invention is a motor driving apparatus with soft-start and soft lock-start function. The output of the motor driving apparatus is determined in accordance with the motor rotation signal. Because the present invention is to include a soft-start and soft lock-start circuit in the conventional motor device, the motor control circuit and the motor output unit in the motor driving apparatus is the same as the conventional motor technology. Therefore, the circuit specification of the motor control circuit and the motor output unit are not shown in the drawings.

Figure 2:
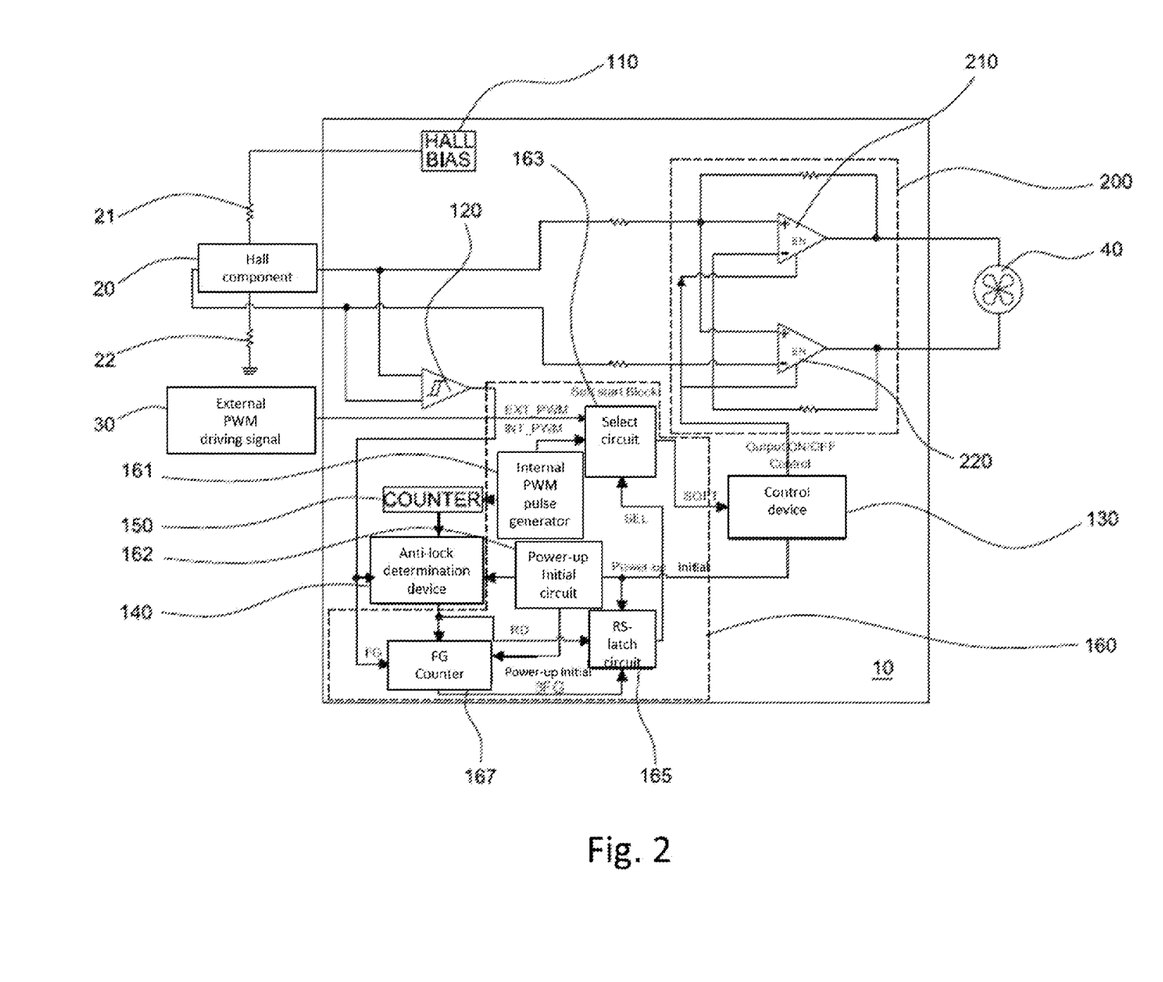
FIG. 2 is a block diagram illustrating the circuits in the preferred embodiment of the present invention.
Figure 3:
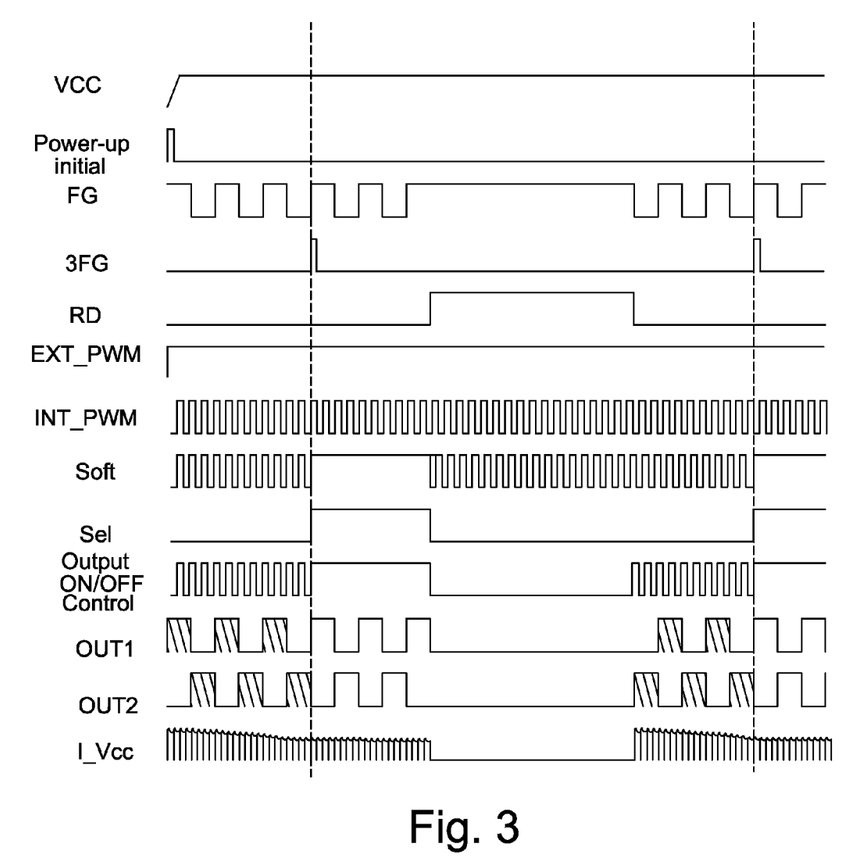
FIG. 3 is a view illustrating the waveforms of the circuits in FIG. 2.

First of all, please referring to FIG. 2 and FIG. 3, FIG. 2 is an embodiment illustrating a motor driving apparatus with soft-start and soft lock-start function in the present invention. FIG. 3 is a signal wave drawing illustrating the motor driving apparatus in FIG. 2. As shown in FIG. 2, the motor driving apparatus 10 of the present invention includes a control unit (not shown), a soft-start unit 160, and an output 200. The output 200 includes a Hall bias 110, a hysteresis device 120, a control device 130, an anti-lock determination device 140 and a counter 150. When the motor driving apparatus 10 is activated (as the waveform of the power source voltage $V_{cc}$ in FIG. 3), an external Pulse Width Modulation (PWM) driving signal (EXT_PWM) 30 is provided by a system outside of the motor driving apparatus 10. The PWM driving signal 30 with high voltage level (the waveform of the PWM driving signal in FIG. 3) will be passed through the control device 130 of the control unit and be transmitted to the output 200. The coil current (input current) of the output unit 200 is controlled by the driving voltage of the external PWM driving signal 30 so as to control the motor 40 to rotate. Subsequently, the Hall component 20 on the motor 40 will transmit the phase change signal to the hysteresis device 120 and the output 200 to determine whether the motor 40 is rotated. Now, the first end of the Hall component 20 is connected to the resistance 21 and the power coil with Hall bias 110. The second end is connected to the resistance 22 and the ground. The voltage level of the Hall signal outputted from the first output and the second output of the Hall component 20 will change in accordance with the rotor position of the motor 40. When the motor 40 is rotated, the Hall signal is phase changed and formed a sine-like wave in accordance with the motor 40 (as the motor output signal shown in FIG. 3). When those sine waves are transmitted to the hysteresis device 120, Frequency Generator (FG) signal is generated. FG signal (as shown in FIG. 3) outputted by the hysteresis device 120 is transmitted to the anti-lock determination device 140.

Please still referring to FIG. 2, the soft-start unit 160 of the soft-start and soft lock-start motor driving apparatus includes an internal PWM pulse generator 161, a power-up initial circuit 162, a select circuit 163, RS latch circuit 165 and FG counter 167. The soft-start unit 160 is connected to the control unit described above, and the detail description of the circuit operation will be described in the following chapter.

When the motor driving apparatus 10 is activated, the control signal will provide an external PWM driving signal (EXT_PWM) with high voltage level to the motor driving apparatus 10, the external PWM driving signal 30 will transmit to the input end of the select circuit 163. Simultaneously, the FG signal outputted by the external PWM driving signal with high voltage level is transmitted to the anti-lock determination device 140 and also transmitted to the FG counter 167. In addition, because there are the internal PWM pulse generator 161 and the power-up initial circuit 162 included in the soft-start unit 160, the internal PWM pulse generator 161 will transmit the internal PWM pulse signal (as the internal driving signal waveform shown in FIG. 3) to the select circuit 163 and the input end of the counter 150 after the motor driving apparatus 10 is activated. At the moment, the power-up initial circuit 162 will transmit a power-up initial signal (as the power initial signal waveform shown in FIG. 3) to the control device 130, RS latch circuit 165, the FG counter 167 and the input end of the anti-lock determination device 140.

Because the internal PWM pulse generator 161 of the soft-start unit 160 in the present invention is disposed within the motor driving apparatus 10, the internal PWM driving signal is adjustable in accordance with the user requirement. In the preferred embodiment of the present invention, the internal PWM driving signal is the PWM pulse signal (as the internal driving signal waveform shown in FIG. 3) which is 50% of the valid duty cycle. When the internal PWM driving signal is transmitted to the counter 150, the counter 150 will count the internal PWM driving signal at a certain time to indicate that the motor rotation is normal. Therefore, the counter 150 will transmit a status signal (such as a signal with low voltage level) to the anti-lock determination circuit 140, and the power-up initial signal is also transmitted to the anti-lock determination circuit 140 from the power-up initial circuit 162 and the anti-lock determination device 140 will output a signal respectively to the RS latch circuit 165 and the input end of the FG counter 167.

Subsequently, when the FG counter 167 receives the FG signal from the hysteresis circuit 120 and the power-up initial signal from the power-up initial circuit 162, the FG counter 167 will output a nFG signal (n is a integral) after counting a certain number. For example, in the present embodiment, when the FG counter 167 receives the FG signal from the hysteresis circuit 120 and the power-up initial signal from the power-up initial circuit 162 (for example, when the VCC power source is on, the power-up initial circuit 162 output a high voltage level signal), the FG counter 167 count three FG signals to output 3FG signal (as the 3FG signal waveform shown in FIG. 3) to the RS latch circuit 165. Therefore, the RS latch circuit 165 will output a select signal (SEL signal as shown in FIG. 3) in accordance with the signals (the power-up initial signal 162 and 3FG signal) received by the input end and the SEL signal is outputted to the select circuit 163. Thereafter, the select circuit 163 will output a soft-start signal (Soft-start as shown in FIG. 3) in accordance with the external PWM driving signal 30, the internal PWM driving signal and the SEL signal to the control device 130. The control device 130 will control the output unit 200 to drive the motor 40 to rotate and the function of the power-up soft-start is achieved.

In addition, because one of the input ends of the anti-lock determination device 140 is connected to the FG signal of the hysteresis device 120 and another input end is connected to the output end of the counter 150. When the counter 150 only counts a high voltage level or low voltage level in a first certain time, it is represented that the phase of the motor 40 is not changed (the motor is in Lock condition). When the motor is in Lock condition, the lock determination circuit 140 will generate a rotation detecting (RD) signal to notify the RS latch circuit 165 that the motor is in Lock condition. The RD signal (as shown in FIG. 3, a high voltage level signal) will reset the FG counter 167, the Hall component 20 will transmit the FG signal generated by the motor generation signal at the Hall amplifier 110 to the FG counter 167 to generate a new counting signal 3FG. The new 3Fg signal and the RD signal generated by the lock determination circuit 165 will be transmitted to the RS latch circuit 165 and a SEL signal is outputted to the select circuit 163. The SEL signal is configured to select the internal PWM driving signal or the external PWM driving signal to be the soft-start signal (as shown in FIG. 3) outputted by the select circuit 163. Therefore, the soft-start signal is transmitted to the control device 130 and the control device 130 will control the output unit 200 to drive the motor 40 to rotate. According to the previous operation, the function of the soft lock-start is achieved.

Obviously, the present invention is to implement an external PWM driving signal 30 transmitted to the RS latch circuit 165 of the soft-start unit 160 to output a SEL signal, and the SEL signal is transmitted to the select circuit 163 to output a soft-start signal. The select circuit 163 is configured to determine the internal PWM driving signal or the external PWM driving signal to be the soft-start signal, and the soft-start signal is transmitted to the output unit 200 from the control device 130 to control the rotation speed of the motor so as to achieve the purpose of power-up soft-start and lock to soft-start. Obviously, in a preferred embodiment of the present invention, after the motor driving apparatus 10 is activated, the select circuit 163 selects the internal PWM driving signal to be the soft-start signal, as the select signal and the soft-start signal waveform in FIG. 3. When the FG counter 167 counts three FG signals, the select circuit 163 selects the external PWM driving signal to be the soft-start signal, as the select signal, the FG signal, the soft-start signal waveform in FIG. 3. In addition, when the anti-lock determination device 140 outputs RD signal, the select circuit 163 will select the internal PWM driving signal to be the soft-start signal. When the deadlock of the motor is terminated and the FG counter 167 counts three FG signals, the select circuit 163 will select the external PWM driving signal to be the soft-start signal, as shown in FIG. 3.

After the FG counter 167 counted three FG signals, the three FG signals are used to be the control signal to select the internal PWM driving signal or the external PWM driving signal to avoid the large current generated at the moment when the motor driving apparatus is turned on. As the power-up current waveform shown in FIG. 3, when the motor driving apparatus 10 is activated, the internal PWM driving signal is used to be the soft-start signal (for example, the internal PWM driving signal is 50% of the PWM pulse signal, so the external PWM driving signal is 100% of the PWM pulse signal is not formed when power is turned on). After three FG signals are passed, the external PWM driving signal 30 is used to be the soft-start signal. According to the start-up current waveform in FIG. 3, when the motor driving apparatus 10 uses the external PWM driving signal 30 to be the soft-start signal, the peak value of the power-up current is decreased to be 65% (the dot line shown in FIG. 3), the large current generated at the power-up moment of the motor driving apparatus 10 is avoided and the noise at the power-up moment is reduced.

Figure 4:
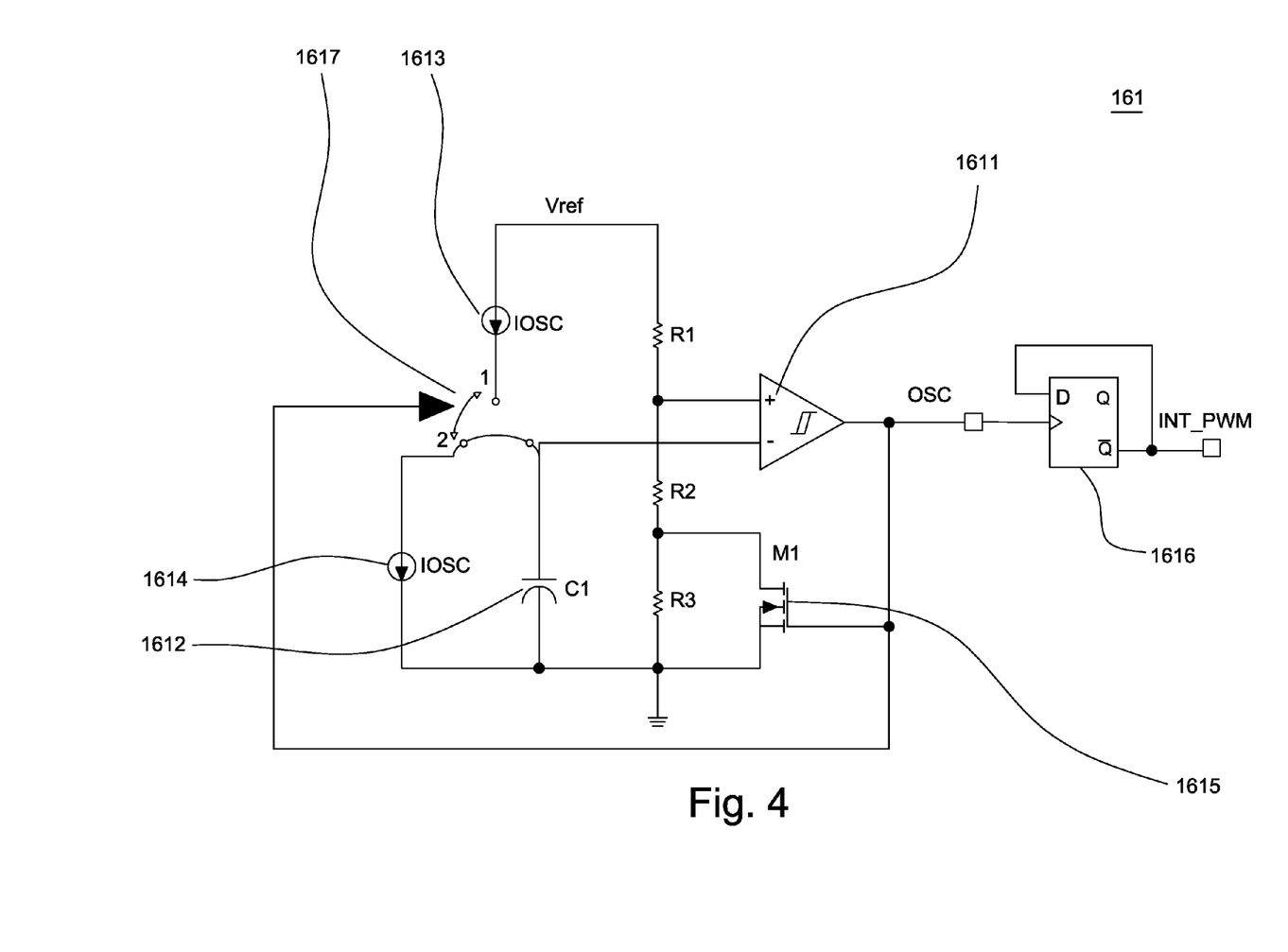
FIG. 4 is a view illustrating the internal PWM driving signal generator in the present invention.

Now, please referring to FIG. 4, it is a view illustrating the internal PWM pulse generator of the soft-start circuit in the present invention. As shown in FIG. 4, the internal PWM pulse generator 161 is an oscillator and includes an operational amplifier (OP amp) 1611, a capacitance ($C_1$) 1612, a power source ($I_{OSC}$) 1613/1614, a transistor ($M_1$) 1615 and resistors $R_1/R_2/R_3$. The oscillation signal (OSC) outputted by the OP amp 1611 is transmitted to the D type counter to generate internal PWM driving signal (INT_PWM).

Still referring to FIG. 4, the detail description of the internal PWM pulse generator 161 will be described in the following paragraph. One end of the OP amp 1611 is connected to the capacitance ($C_1$) 1612, the first current source ($I_{OSC}$) 1613 and the second current source ($I_{OSC}$) 1614 in the internal PWM pulse generator 161. The switch 1617 switches to position 1 or position 2 in accordance with the output of the OP Amp 1611 so as to control the second current source ($I_{OSC}$) 1614 to charge or discharge the capacitance 1612. As the embodiment shown in FIG. 4, when the switch 1617 is in position 1, the capacitance ($C_1$) 1612 is charged. When the switch 1617 is in position 2, the capacitance ($C_2$) 1612 is discharged. Moreover, the second input end of the OP amp 1611 is connected to the first end of the resistor R1 and the resistor $R_2$. The second end of the resistor R1 is connected to the reference voltage end ($V_{ref}$) and the second end of the resistor $R_2$ is connected to the first end of the resistor $R_3$. The second end of the resistor $R_3$ is connected to the ground.

Therefore, the charging voltage level and the discharging voltage level in the internal PWM pulse generator 161 are formed.

In addition, the charging voltage level and the discharging voltage level of 1615 of the internal PWM pulse generator 161 is controlled by the transistor ($M_1$). For example, when the voltage of the capacitance ($C_1$) is 0, the voltage generated at the resistor $R_1$, $R_2$ and $R_3$ is higher than the voltage in the capacitance ($C_1$) 1612. Therefore, the transistor ($M_1$) 1615 is OFF, and the switch 1617 is in the position 1 and the first current source ($I_{OSC}$) 1613 starts to charge in the capacitance ($C_1$) 1612. When the voltage in the capacitance ($C_1$) 1612 is higher than the bias voltage in the resistor $R_1$, $R_2$ and $R_3$, the transistor ($M_1$) is ON, the voltage in the resistor $R_1$, $R_2$ and the transistor ($M_1$) 1615 is lower than the voltage in the capacitance ($C_1$) 1612 and the switch 1617 is in the position 2. The second current source ($I_{OSC}$) will discharge in the capacitance ($C_1$). When the voltage in the capacitance ($C_1$) is lower than the voltage in resistor $R_1$, $R_2$ and the transistor ($M_1$) 1615, the transistor ($M_1$) will turn OFF again and the switch 1617 is in position 1. Therefore, the first current source ($I_{OSC}$) 1613 will recharge in the capacitance ($C_1$) 1612. At final, the output end of the OP Amp 1611 will output an oscillation signal (OSC) to the D type counter 1616 and the D type counter 1616 will generate the internal PWM driving signal (INT_PWM). For example, in the present embodiment, the duty cycle of the internal PWM driving signal (INT_PWM) is 50% of the PWM pulse signal.

Figure 5:
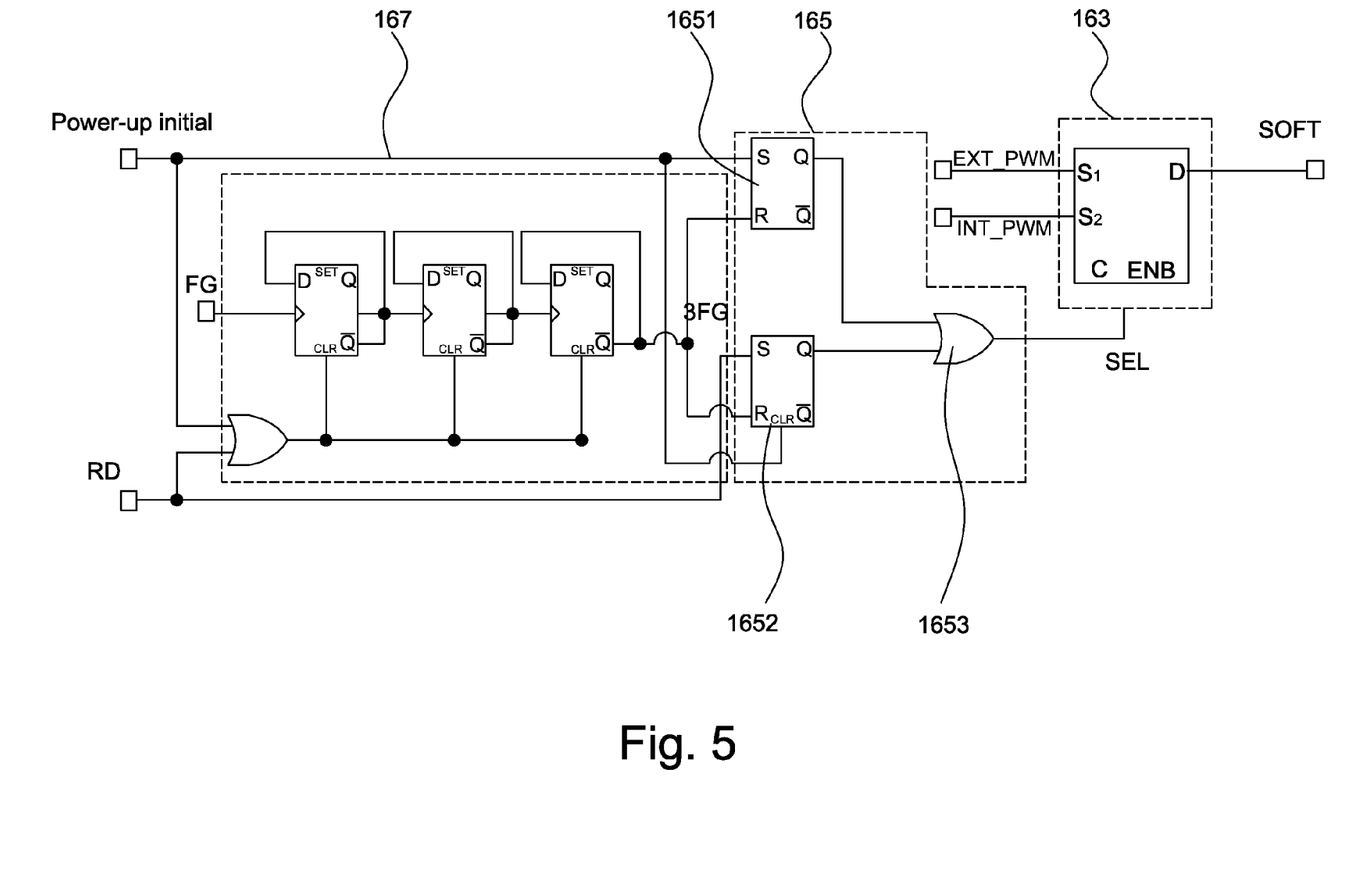
FIG. 5 is a view illustrating the soft-start circuit in the present invention.

FIG. 5 is a circuit view illustrating the soft-start circuit in one embodiment of the present invention. As shown in FIG. 5, the FG signal inputted to the FG counter 167 is generated by the phase change signal, which is transmitted to the hysteresis device 120 by the Hall component 20. Therefore, whether the FG signal is positive or negative is accordance with the related position of the Hall component 20 and the motor 40 (as the motor output signal waveform shown in FIG. 3). In addition, when the power source of the motor driving apparatus 10 is turned on, the internal PWM driving signal (INT_PWM) generated by the internal PWM pulse generator 161 is transmitted to the input end of the select circuit 163. The power-up initial circuit 162 will transmit a power-up initial signal to reset all the counters in the soft-start unit 160 and the output signal of the FG counter is set to be 0, as the power-up initial signal and the 3FG signal waveform shown in FIG. 3. When the FG signal is transmitted to the FG counter 167, the FG counter 167 will start to count. For example, in the present embodiment, there are 3 D types counters used in the FG counter 167 and the output end of the FG counter 167 is changed from 0 to 1 after 3 FG signals are counted. The output signal will be transmitted by the FG counter 167 to the RS latch circuit 165 to be the input signal of the RS latch circuit 165. It should be noted that how many FG signals used in the FG counter 167 of the present invention to improve the output status is accordance with the requirement of the user and it is not limited herein.

In addition, when the motor 40 is started and the irresistible external force is existed or the motor driving apparatus 10 is broken down, the motor 40 is in deadlock condition. The anti-lock determination circuit 140 will output a RD signal (such as a high voltage level signal) to the FG counter 167 to reset all the counter and the 3FG signal outputted by the FG counter 167 is 0, as the RD and 3FG waveform shown in FIG. 3. When the motor 40 is reactivated, the FG signal will be re-transmitted to the FG counter 167 and the FG counter 167 will start to count. After 3 FG signals are counted, the output end of the FG counter 167 will be changed from 0 to 1. The FG counter 167 will output the output signal to the RS latch circuit 165 to be one input signal of the RS latch circuit 165.

In the embodiment of the present invention, the RS latch circuit 165 is made by two RS latches 1651/1652. The first input end of the first RS latch 1651 is connected to the power-up initial signal transmitted by the power-up initial circuit 162, and the second input end is connected to the 3FG signal. The first input end of the second RS latch 1652 is connected to the 3FG signal and the second input end is connected to the RD signal. The reset signal of the second RS latch 1652 is controlled by the power-up initial signal and the two RS latches will transmit the output signal to a logic gate 1653 to do a plus operation so as to output a SEL signal. The SEL signal is the SEL shown in FIG. 3. The SEL signal will transmit to the select circuit 163 to be the control signal. When the power of the motor driving apparatus 10 is turned on or the moment of the deadlock of the motor, the power-up initial signal or RD signal is transmitted to the RS latch circuit 165 and the RS latch circuit 165 is to control the output of the SEL signal. When the FG counter 167 counts 3 FG signals, a 3FG signal is 1 and transmitted to reset the SEL signal from 0 to be 1.

Still referring to FIG. 5, the select circuit 163 is made by a multiplexer, and the first input end ($S_1$) thereof is connected to the external PWM driving signal (EXT_PWM) 30 and the second end $S_2$ is connected to the internal PWM driving signal (INT_PWM). The select circuit 163 choosing the external PWM driving signal (EXT_PWM) 30 or the internal PWM driving signal (INT_PWM) to be the output signal is determined by the SEL signal. For example, when the SEL signal is 0, the select circuit 163 chooses the soft-start signal to be the internal driving signal (INT_PWM) 30, and when the SEL signal is 1, the select circuit 163 chooses the soft-start signal to be the external PWM driving signal (EXT_PWM). Therefore, when the power-up initial signal or the RD signal is 1, the FG counter 167 will be reset. The SEL signal is set to be 0 and transmitted to the select circuit 163 so as to choose the internal PWM driving signal (INT_PWM) to be the soft-start signal. Therefore, the internal PWM driving signal (INT_PWM) of the soft-start signal is transmitted to the control device 130 and the output unit 200 to control the rotation of the motor 40. Obviously, the motor 40 is not controlled by the external PWM driving signal (EXT_PWM), but controlled by the internal PWM driving signal (INT_PWM) to include the power-up soft-start and the soft lock-start function. When the FG counter 167 counts 3 FG signals, the FG counter 167 will output a signal, which is 1, to the RS latch circuit 165 to reset two RS latches 1651/1652. Therefore, the two latches signal in the two RS latches 1651/1652 is 1, and the SEL signal is changed from 0 to 1 after the RS latches signal transmitted to the logic gate 1653. When the RS latch circuit 165 transmits the SEL signal, which is 1, to the select circuit 163, the select circuit 163 chooses the external PWM driving signal (EXT_PWM) to be output and the external PWM driving signal (EXT_PWM) signal is transmitted to the control device 130 and the output unit 200 controls the rotation of the motor 40.

According to the description above, the control unit (the Hall bias 110, the hysteresis device 120, the control device 130, the anti-lock determination device 140 and the counter 150), the soft-start unit 160 (the internal PWM pulse signal generator 161, the power-up initial circuit 162, the select circuit 163, the RS latch circuit 165 and the FG counter 167) and the output unit 200 in the motor driving apparatus 10 of the present invention are arranged together to be a motor driving chip in accordance with the semiconductor process.

Moreover, according to the customer require, the motor driving device 10 in the present invention doesn't include an anti-lock determination device 140 in the control unit and the soft-start function is still included in the present invention. When the control unit in the motor driving apparatus 10 doesn't include anti-lock determine device 140, the hysteresis device 120 will transmit the motor rotation signal (FG) converted by the phase change signal of the motor rotation of the Hall component to the FG counter 167. The power-up initial circuit 162 will also transmit the power-up initial signal to the FG counter to be a reset signal in the counter of the reset soft-start unit 160. When the FG counter 167 counts 3 FG signals and outputs a 3FG signal, which is 1, as shown in FIG. 3. Thereafter, FG counter 167 will transmit the 3FG signal, which is 1, to the RS latch circuit 165 to be the input signal of the RS latch circuit 165. Because the rest of the circuits in the present embodiment are the same as the circuits in the previous embodiments, the detail description of the rest of the circuits is omitted herein.

Although specific embodiments have been illustrated and described, it will be appreciated by those skilled in the art that various modifications may be made without departing from the scope of the present invention, which is intended to be limited solely by the appended claims.

What is claimed is:

1. A motor driving apparatus including a control unit, a soft-start unit, and an output unit, wherein the motor driving apparatus is characterized in that:
   the soft-start unit includes:
   an internal pulse width modulation (PWM) pulse signal generator configured to provide an internal PWM driving signal;
   a power-up initial generator configured to provide a power-up initial signal;
   a FG counter connected to a motor rotation signal and the power-up initial signal via an input end of the FG counter, and configured to count a number being a multiple of the motor rotation signal (FG) so as to output a control signal;
   a RS latch circuit having an input end connected to the power-up initial signal and the control signal outputted by the FG counter so as to output a select signal; and
   a select circuit having a first input end connected to an external PWM driving signal, a second input end connected to the internal PWM driving signal, a third input end connected to the select signal, and a output end transmitting a soft-start control signal to the control unit;
   wherein when power-up and the external PWM driving signal is inputted to the soft-start unit, the soft-start unit generates the internal PWM driving signal and provides the power-up initial signal; after the power-up initial signal is generated, the control unit transmits the motor rotation signal to the soft-start circuit, and the soft-start circuit selects the internal PWM driving signal and outputs the soft-start control signal to the control unit; and
   when the soft-start circuit receives the motor rotation signal and the power-up initial signal, the soft-start circuit counts the number being a multiple of the motor rotation signal (FG) and selects the external PWM driving signal and transmits the soft-start control signal to the control unit.

2. A motor driving apparatus including a control unit, a soft-start unit, and an output unit, wherein the motor driving apparatus is characterized in that:
   the soft-start unit includes:
   an internal pulse width modulation (PWM) pulse signal generator configured to provide an internal PWM driving signal;
   a power-up initial generator configured to provide a power-up initial signal;
   a FG counter connected to a motor rotation signal and the power-up initial signal via an input end of the FG counter, and configured to count a number being a multiple of the motor rotation signal (FG) so as to output a control signal;
   a RS latch circuit having an input end connected to the power-up initial signal and the control signal outputted by the FG counter so as to output a select signal; and
   a select circuit having a first input end connected to an external PWM driving signal, a second input end connected to the internal PWM driving signal, a third input end connected to the select signal, and a output end transmitting a soft-start control signal to the control unit;
   the control unit includes:
   a Hall bias configured to provide a power source to a Hall component and the Hall component detects a phase change signal when a motor is rotated;
   a hysteresis device connected to the Hall component, and converts the phase change signal to the motor rotation signal (FG);
   a counter having an input end is connected to the motor rotation signal (FG) and the internal PWM driving signal and having a output end outputting a counting signal; and
   a control device having an input end connected to the power-up initial signal and the soft-start control signal and having a output end outputting a signal to the output unit;
   wherein when power-up and the external PWM driving signal is inputted to the soft-start unit, the soft-start unit generates the internal PWM driving signal and provides the power-up initial signal; the power-up initial signal is generated, the control unit transmits the motor rotation signal to the soft-start circuit, and the soft-start circuit selects the internal PWM driving signal and outputs the soft-start control signal to the control unit; and
   when the soft-start circuit receives the motor rotation signal and the power-up initial signal, the soft-start circuit counts the number being a multiple of the motor rotation signal (FG) and selects the external PWM driving signal and transmits the soft-start control signal to the control unit.

3. A motor driving apparatus including a control unit, a soft-start unit and an output unit, wherein the control unit includes a motor rotation signal (FG) and a rotation detecting signal (RD), wherein the motor driving apparatus is characterized in that:
   the soft-start unit includes:
   an internal pulse width modulation (PWM) pulse signal generator configured to provide an internal PWM driving signal;
   a power-up initial generator configured to provide a power-up initial signal;
   a FG counter connected to a motor rotation signal and the power-up initial signal via an input end of the FG counter, and configured to count a number being a multiple of the motor rotation signal (FG) so as to output a control signal;
   a RS latch circuit having an input end connected to the power-up initial signal and the control signal outputted by the FG counter so as to output a select signal; and
   a select circuit having a first input end connected to an external PWM driving signal, a second input end connected to the internal PWM driving signal, a third input end connected to the select signal, and a output end transmitting a soft-start control signal to the control unit;

wherein when lock release and the external PWM driving signal is inputted to the soft-start unit, the soft-start unit generates the internal PWM driving signal and the rotation detecting signal (RD);

after the rotation detecting signal (RD) is generated, the control unit transmits the motor rotation signal to the soft-start unit, and the soft-start unit selects the internal PWM driving signal and outputs the soft-start control signal to the control unit; and when the soft-start circuit receives the motor rotation signal and the power-up initial signal, the soft-start circuit counts the number being a multiple of the motor rotation signal (FG) and selects the external PWM driving signal and transmits the soft-start control signal to the control unit.

4. A motor driving apparatus including a control unit, a soft-start unit and an output unit, wherein the control unit includes a motor rotation signal (FG) and a rotation detecting signal (RD), wherein the motor driving apparatus is characterized in that:

the soft-start unit includes:

an internal pulse width modulation (PWM) pulse signal generator configured to provide an internal PWM driving signal;

a power-up initial generator configured to provide a power-up initial signal;

a FG counter connected to a motor rotation signal and the power-up initial signal via an input end of the FG counter, and configured to count a number being a multiple of the motor rotation signal (FG) so as to output a control signal;

a RS latch circuit having an input end connected to the power-up initial signal and the control signal outputted by the FG counter so as to output a select signal; and a select circuit having a first input end connected to an external PWM driving signal, a second input end connected to the internal PWM driving signal, a third input end connected to the select signal, and a output end transmitting a soft-start control signal to the control unit;

the control unit includes:

a Hall bias configured to provide a power source to a Hall component and the Hall component detects a phase change signal when a motor is rotated;

a hysteresis device connected to the Hall component, and converts the phase change signal to the motor rotation signal (FG);

a counter having an input end connected to the motor rotation signal (FG) and the internal PWM driving signal, and having a output end outputting a counting signal;

an anti-lock determination device having an input end connected to the power-up initial signal, the counting signal and the motor rotation signal (FG), and when the phase of the motor rotation signal is not changed, the rotation detection signal (RD) is outputted; and a control device having an input end connected to the power-up initial signal and the soft-start control signal, and having a output end outputting a signal to the output unit;

wherein when lock release and the external PWM driving signal is inputted to the soft-start unit, the soft-start unit generates the internal PWM driving signal and the rotation detecting signal (RD);

after the rotation detecting signal (RD) is generated, the control unit transmits the motor rotation signal to the soft-start unit, and the soft-start unit selects the internal PWM driving signal and outputs the soft-start control signal to the control unit; and when the soft-start circuit receives the motor rotation signal and the power-up initial signal, the soft-start circuit counts the number being a multiple of the motor rotation signal (FG) and selects the external PWM driving signal and transmits the soft-start control signal to the control unit.

5. A motor driving apparatus including a control unit, a soft-start unit and a output unit, wherein the motor driving apparatus is characterized in that:

wherein the soft-start unit includes:

an internal PWM pulse signal generator configured to provide an internal PWM driving signal;

a power-up initial generator configured to provide a power-up initial signal;

a FG counter, and an input end thereof is connected to the motor rotation signal and the power-up initial signal, and configured to count a plurality of the motor rotation signals (FG) so as to output a control signal;

a RS latch circuit, and an input end thereof is connected to the power-up initial signal and the control signal outputted by the FG counter so as to output a select signal; and a select circuit, and a first input end thereof is connected to the external PWM driving signal, a second input end is connected to the internal PWM driving signal, a third input end is connected to the select signal and a output end transmits a soft-start control signal to the control unit and the control unit outputs a PWM driving signal to the output unit.

6. The motor driving apparatus of claim 5, wherein the number of the motor rotation signals counted by the soft-start unit is three.

7. The motor driving apparatus of claim 5, wherein the control unit includes:

a Hall bias configured to provide a power source to a Hall component and the Hall component detects a phase reverse signal when a motor is rotated;

a hysteresis device connected to the Hall component, and converts the phase reverse signal to the motor rotation signal (FG);

a counter, and an input end thereof is connected to the motor rotation signal (FG) and the internal control signal and outputs a counting signal; and a control device, and an input end thereof is connected to the power-up initial signal and the soft-start control signal and outputs a PWM driving signal to the output unit.

8. The motor driving apparatus of claim 5, wherein the control unit includes:

a Hall bias configured to provide a power source to a Hall component and the Hall component detects a phase reverse signal when a motor is rotated;

a hysteresis device connected to the Hall component, and converts the phase reverse signal to the motor rotation signal (FG);

a counter, and an input end thereof is connected to the internal PWM driving signal and outputs a counting signal;

a anti-lock determination device, and an input end thereof is connected to the power-up initial signal, the counting signal and the motor rotation signal (FG), and the rotation detection signal (RD) is outputted; and a control device, and an input end thereof is connected to the power-up initial signal and the soft-start control signal and outputs the PWM driving signal to the output unit.

9. A motor driving apparatus including a control unit, a soft-start unit and an output unit, and the control includes provides a rotation detecting signal, the motor driving apparatus is characterized in that:

wherein the soft-start unit includes:

an internal PWM pulse signal generator configured to provide an internal PWM driving signal;

a power-up initial generator configured to provide a power-up initial signal;

a FG counter, and an input end thereof is connected to the motor rotation signal and the power-up initial signal, and configured to count a plurality of the motor rotation signal (FG) so as to output a control signal;

a RS latch circuit, and an input end thereof is connected to the power-up initial signal and the control signal outputted by the FG counter so as to output a select signal; and a select circuit, and a first input end thereof is connected to the external PWM driving signal, a second input end is connected to the internal PWM driving signal, a third input end is connected to the select signal and a output end transmits a soft-start control signal to the control unit and the control unit outputs a PWM driving signal to the output unit.

10. The motor driving apparatus of claim 9, wherein the control unit includes:

a Hall bias configured to provide a power source to a Hall component and the Hall component detects a phase reverse signal when a motor is rotated;

a hysteresis device connected to the Hall component, and converts the phase reverse signal to the motor rotation signal (FG);

a counter, and an input end thereof is connected to the motor rotation signal (FG) and the internal control signal and outputs a counting signal; and a control device, and an input end thereof is connected to the power-up initial signal and the soft-start control signal and outputs the PWM driving signal to the output unit.

11. The motor driving apparatus of claim 9, wherein the control unit includes:

a Hall bias configured to provide a power source to a Hall component and the Hall component detects a phase reverse signal when a motor is rotated;

a hysteresis device connected to the Hall component, and converts the phase reverse signal to the motor rotation signal (FG);

a counter, and an input end thereof is connected to the internal control signal and outputs a counting signal;

a anti-lock determination device, and an input end thereof is connected to the power-up initial signal, the counting signal and the motor rotation signal (FG), and the rotation detection signal (RD) is outputted; and a control device, and an input end thereof is connected to the power-up initial signal and the soft-start control signal and outputs a PWM driving signal to the output unit.

* * * * *